(No Model.) 2 Sheets—Sheet 1.

J. JACOBS.
ILLUMINATING TILE.

No. 458,849. Patented Sept. 1, 1891.

Witnesses:
Jas. E. Hutchinson
Henry C. Hazard

Inventor:
Jacob Jacobs
by Pinckney Russell
his Attorney (No Model.) 2 Sheets—Sheet 2.

J. JACOBS.
ILLUMINATING TILE.

No. 458,849. Patented Sept. 1, 1891.

Witnesses:
Jas. E. Hutchinson.
Henry C. Hazard.

Inventor.
Jacob Jacobs
by Rindle and Russell
his Attorney.

UNITED STATES PATENT OFFICE.

JACOB JACOBS, OF NEW YORK, N. Y.

ILLUMINATING-TILE.

SPECIFICATION forming part of Letters Patent No. 458,849, dated September 1, 1891.

Application filed February 26, 1891. Serial No. 382,974. (No model.)

*To all whom it may concern:*

Be it known that I, JACOB JACOBS, a citizen of the United States, residing at New York, in the county of New York, and in the State of New York, have invented certain new and useful Improvements in Illuminating-Tiles; and I do hereby declare that the following is a full, clear, and exact description thereof, reference being had to the accompanying drawings, in which—

Figure 1:
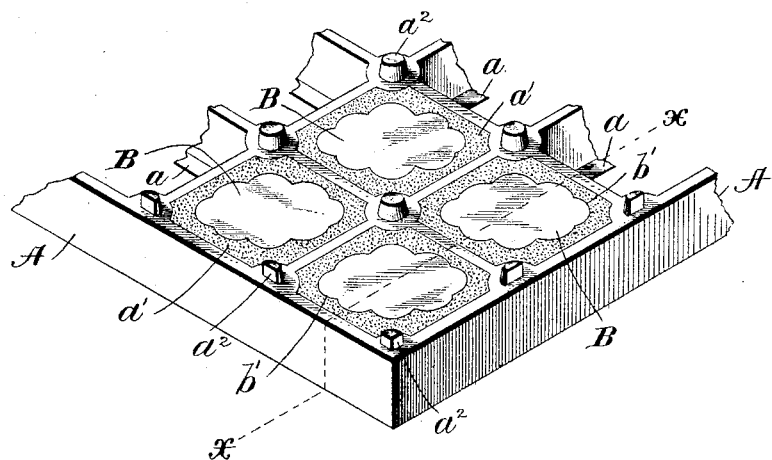
Figure 2:
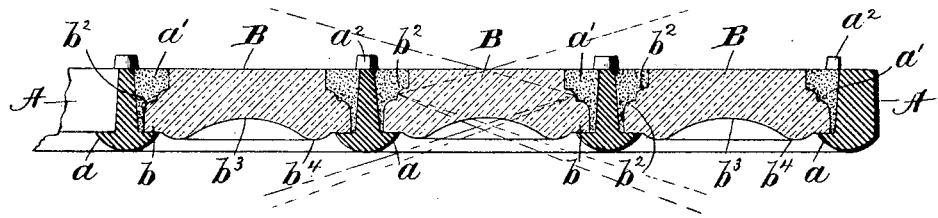
Figure 3:
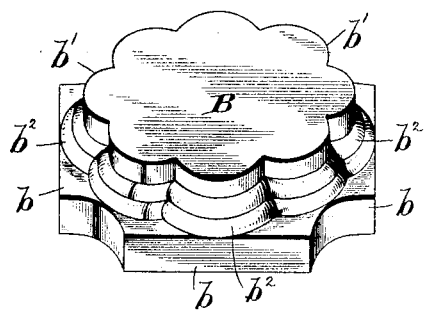
Figure 4:
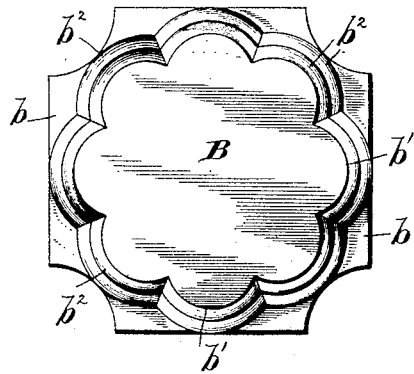
Figure 5:
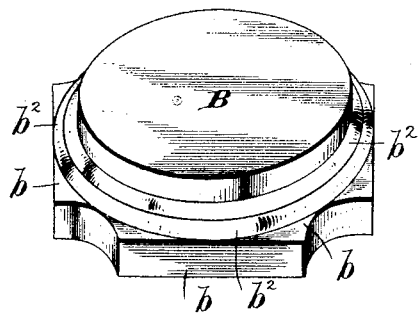
Figure 6:
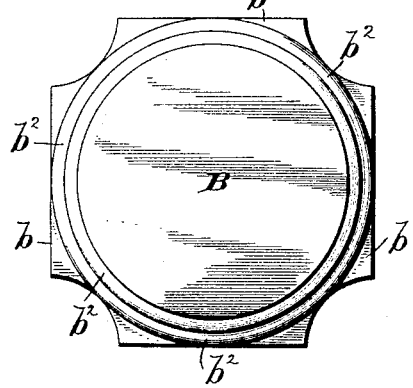

Figure 1 shows a perspective view of a portion of an illuminating-tile made in accordance with my invention; Fig. 2, a section of the same on line x x of Fig. 1; Fig. 3, a perspective view of one of my improved lenses used in the tile; Fig. 4, a plan view of the same; Fig. 5, a perspective view of another form of my lens, and Fig. 6 a plan view of the same.

Letters of like name and kind refer to like parts in each of the figures.

The object of my invention is to provide certain improvements in illuminating-tiles; and to this end my invention consists in the tile and in the lenses therefor, constructed and arranged as hereinafter specified.

The special purpose of my invention is to produce an illuminating-tile in which the lenses shall be capable of distributing the transmitted light to the best effect, and which shall at the same time be simple and cheap in construction and ornamental in appearance. As will be seen, the form of lens used is especially designed to secure illumination of all the space not only immediately below, but on all sides of the opening in which the tile is placed.

In the drawings, A designates the metal frame of the tile provided with a series of openings for the lenses B B, provided around their lower edges with inwardly-projecting ribs or ledges $a$ $a$ for the lenses to rest upon. The latter are held in place within the openings by cement $a'$, surrounding them in the usual way. Upon its upper side the tile is preferably provided with short studs $a^2$ $a^2$, situated between the light-openings, as shown, their object being to protect the upper faces of the lenses from being scratched or marred.

The form of lens which I use has its lower part $b$ adapted to rest upon and be supported by the ledge or rib $a$ around the respective light-opening in the tile-frame. As shown, such part is substantially square in general shape with its corners cut off; but I do not limit myself to such construction. It is preferably, but not necessarily, made to substantially fit within the opening which is to receive it.

The upper face of the lens shown in Figs. 1 to 4, inclusive, which is the one I prefer, is made with a scalloped outline, the scallops $b'$ $b'$ being, for appearance sake, substantially equal in extent and symmetrically arranged. The lens-periphery between the scalloped top and the lower rectangular part $b$ is not plane, but is made up of a series of rounded ribs $b^2$ $b^2$, of which each lower one projects out beyond the one above it. As illustrated in the figures above referred to, the rib outline is a scalloped one, corresponding with that of the lens-top, while in the other form shown in Figs. 5 and 6 both the lens-top and the ribs are made circular in shape. The rounded outer surfaces of the ribs are so constructed as to present when seen in cross-section a series of curves, of which each successive one, starting from the end of the one next above, runs outward and then downward to the succeeding lower curve. With this construction, as will be seen best in Fig. 2, I provide a lens which presents to the rays of light striking in through its top at considerable angles from a perpendicular a series of curved reflecting-surfaces, which will deflect said rays and throw them outward through the bottom of the lens in such direction that they will penetrate and illuminate most fully the space extending beyond the sides of the tile in which the lens is used.

In order that a thin edge of the inclosing cement may not be left around the top of the lens, I prefer to stop the series of ribs at a point below said top, so as to leave the upper part of the side of the lens with upright walls. This arrangement enables me to make that part of the cement body upon which wear may come thick enough to prevent its inner edge from being easily chipped or broken off. The under side of each lens is preferably made concave, as shown, with the outer edge of the concavity $b^3$, connecting with the convex surface of an annular rib $b^4$, projecting below the face of the part of the lens which is to rest upon the tile-frame ledge $a$. With the described concavity on the lens-bottom, the round-surfaced rib $b^4$ projecting down through the light-opening in the frame, and the rounded ribs $b^2$ $b^2$ in the lens side I can secure a thorough distribution of the light passing through the lens. By an illuminating-tile containing lenses with such features illumination not only of the space immediately below the tile, but also that extending in all directions beyond the closed opening, can be obtained.

The form of lens which I prefer with its scallop-edged top, besides securing the desired distribution of light, also gives the tile an ornamental and attractive appearance, as will be seen from Fig. 1 of the drawings.

The shape of the lens with the rounded ribs $b^2$ $b^2$ projecting successively farther and farther outward as the bottom of the lens is approached, makes the molding of the improved form simple and easy, so that the finished article need not be any more expensive than the ordinary and well-known ones heretofore used in illuminating-tiles.

Having thus described my invention, what I claim is—

1. A lens for illuminating-tiles, having its side periphery provided with a series of ribs of which each lower one projects out beyond the one next above it, substantially as and for the purpose specified.

2. A lens for illuminating-tiles, having its bottom made concave and provided with an annular downwardly-extending rib around the concavity and having its side periphery provided with a series of ribs, of which each lower one projects out beyond the one next above it, substantially as and for the purpose set forth.

3. A lens for illuminating-tiles, having the lower portion to be received and supported within the light-opening in a tile-frame, its upper portion formed so as to have a scalloped outline, and its side periphery provided with rounded ribs, of which each lower one projects out beyond the one next above it, substantially as and for the purpose described.

4. A lens for illuminating-tiles, having its lower portion adapted to fit within a light-opening in the tile-frame, its top with scalloped outline, and its side periphery having the series of ribs scalloped like the top, of which each lower one projects out beyond that next above it, substantially as and for the purpose specified.

5. An illuminating-tile in which the light-openings contain lenses, each having its side periphery provided with a series of ribs projecting farther outward as the bottom of the lens is approached, substantially as and for the purpose described.

6. An illuminating-tile in which the light-openings in the frame are provided with lenses having tops made smaller in diameter than the bottoms and their side peripheries provided with ribs, of which each successively lower one projects beyond that above it, substantially as and for the purpose set forth.

7. An illuminating-tile in which are lenses having the upper portion of their bodies provided with numerous peripheral scallops, whereby the reflecting capacity of the lens is augmented, substantially as and for the purpose specified.

In testimony that I claim the foregoing I have hereunto set my hand this 14th day of January, A. D. 1891.

JACOB JACOBS.

Witnesses:
FRANKLIN LYNCH,
GEO. W. TICE.